Aug. 30, 1932.  H. M. LOFTON  1,874,556
GATE VALVE
Filed Sept. 5, 1931  2 Sheets-Sheet 2
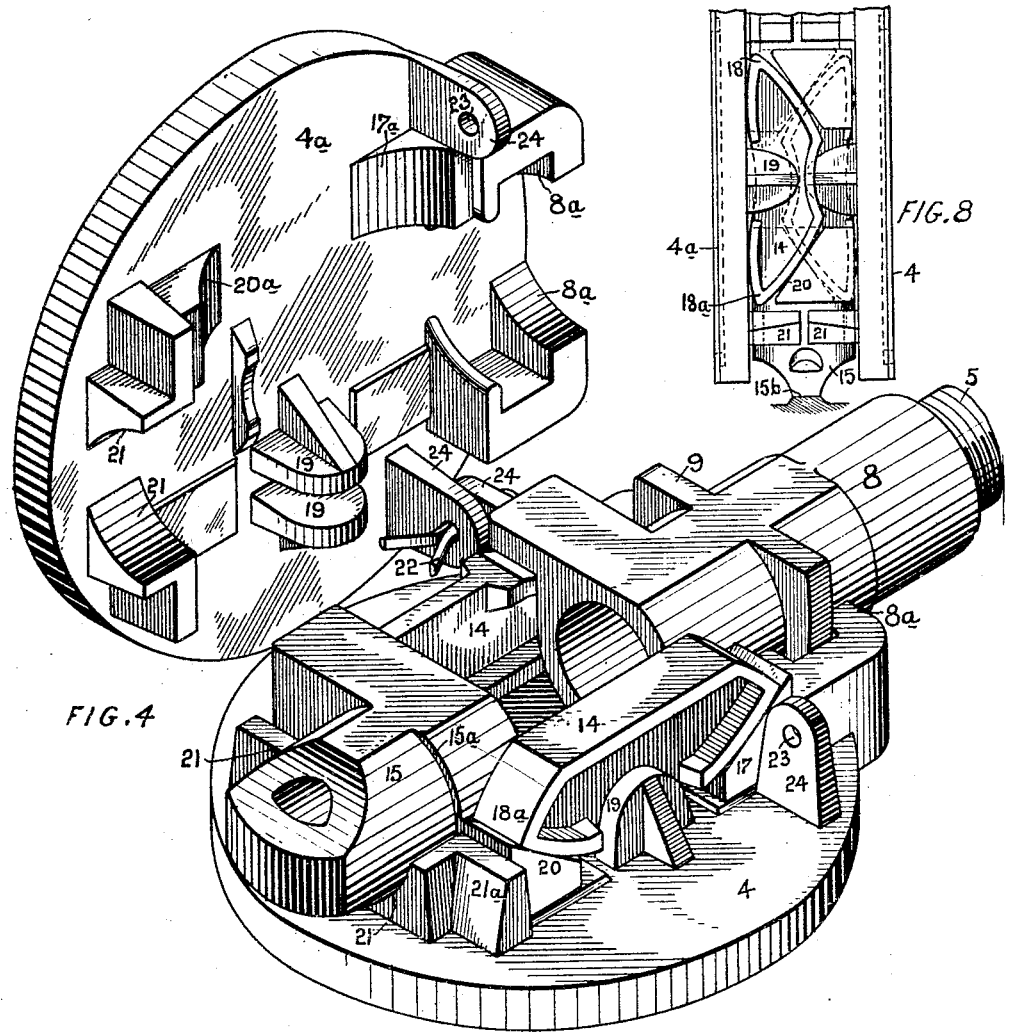
FIG.4
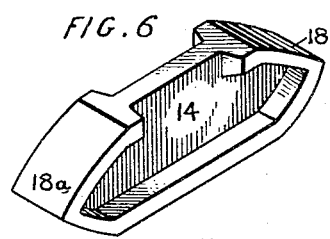
FIG.8
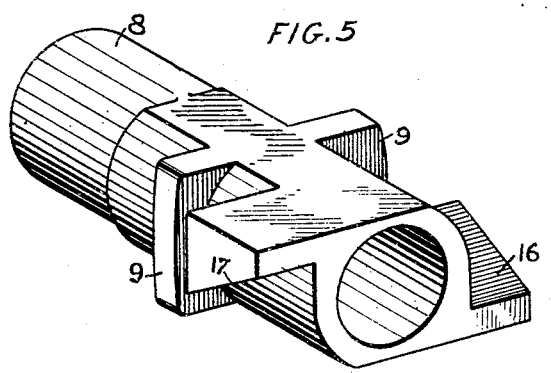
FIG.5
FIG.6
Inventor.
Herbert M. Lofton
By 
Attorney.

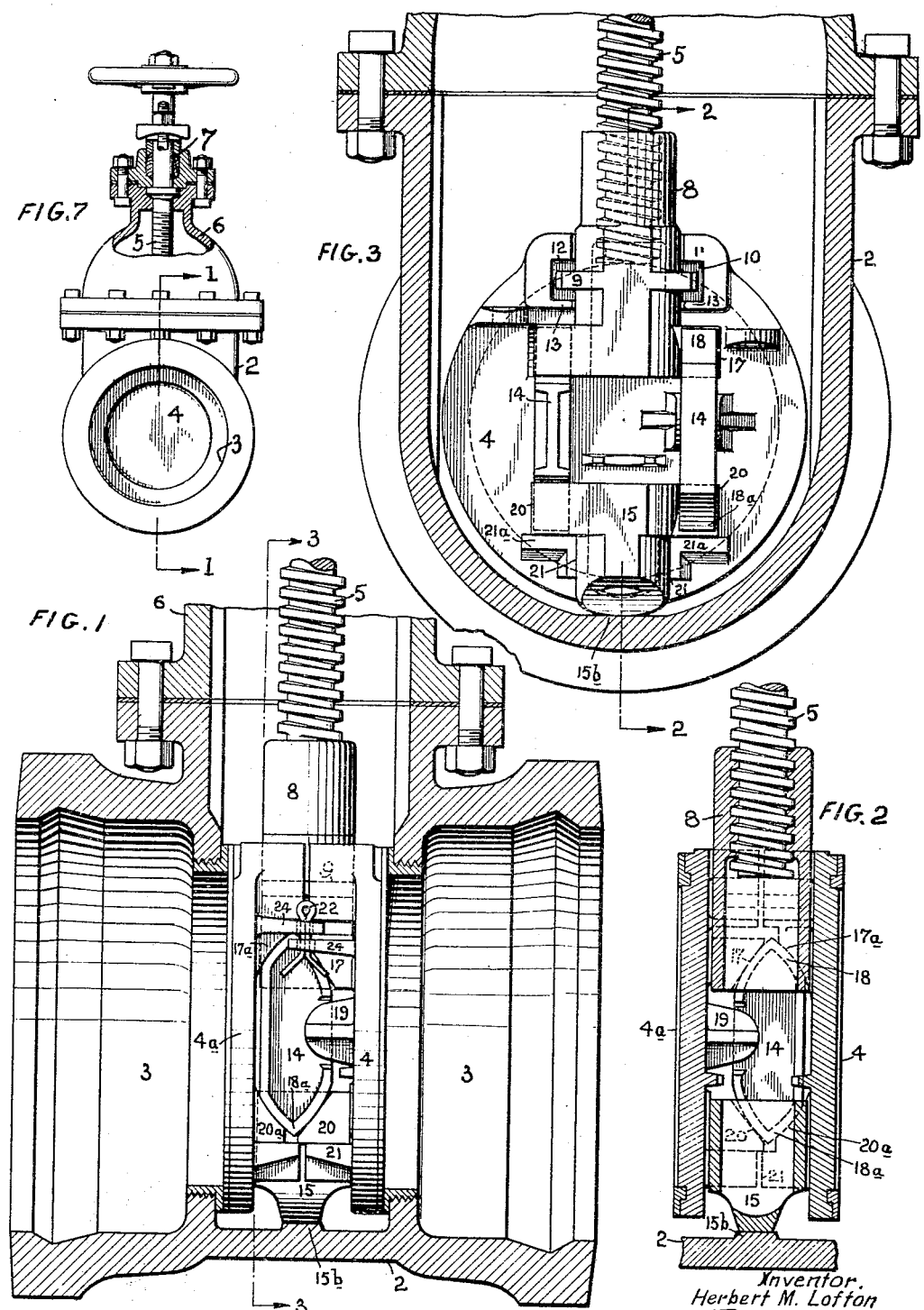

Patented Aug. 30, 1932

1,874,556

UNITED STATES PATENT OFFICE

HERBERT M. LOFTON, OF CHATTANOOGA, TENNESSEE

GATE VALVE

Application filed September 5, 1931. Serial No. 561,337.

My invention has reference to what is known as a double disc parallel seat gate valve and is directed to the wedging mechanism only and does not contemplate any improvement in the valve body, bonnet or stem.

In nearly all types of double disc gate valves having parallel seats, as now manufactured, there are serious defects, largely due to the fact that in exerting the pressure on the valve stem through the threaded operating nut the tendency is to throw a side pressure on the valve stem, causing it to bend or become distorted and often entirely broken because of the great strain due to the wedging mechanism which forces the stem to one side or the other in order to exert sufficient pressure on the inner side of the disc.

Another serious defect in most valves now in use is that they are so made that in applying the pressure against the inner sides of the valve discs to force them respectively against the valve seats, the pressure is applied usually at only one point or in some form which causes the pressure to be applied unequally against the area of the valve discs, causing said discs to become warped or leaky and requiring them to be made undesirably massive.

It is the object of my present invention to so construct the wedge operating portions of the mechanism as will overcome the objections which have been above pointed out as existing in the present commercial form of gate valves of the double disk parallel seat types; and these improvements include the employment of upper and lower wedge nuts adjustably supported by the discs and associated with cooperating wedge-shaped spreaders making engagement with both the wedge-shaped nuts and discs, whereby not only does the longitudinal adjustment of the nuts and spreaders cooperate in imparting a relative spreading action between the discs to insure closure contact with the parallel valve seats, but also transforms the rotary effort of the valve stem and nuts into a further spreading action upon the discs.

My invention also comprehends other features of improvement, which, together with those enumerated above, are fully set out hereinafter and illustrated in the drawings, in which:

Fig. 1 is a vertical section on line 1—1 of Fig. 7 of the valve with a portion of the body or housing removed, showing the interior wedge mechanism for actuating the valve discs during the normal operations of opening and closing of the valve; Fig. 2 is a vertical section of the operating parts of my improved gate valve taken on a plane 2—2 of Fig. 3 coincident with the longitudinal axis of the valve; Fig. 3 is a transverse sectional view, taken along the line 3—3 of Fig. 1; Fig. 4 is a perspective view showing one of the valve discs in association with the operative means and with the other disc raised to more fully disclose said operative parts of the valve mechanism; Fig. 5 is a perspective view of the stem nut showing its collar and inclined planes; Fig. 6 is a perspective view of one of the spreaders; Fig. 7 is a general view of a typical form of gate valve, partly in section, to which my improvements are applicable; and Fig. 8 illustrates a modified form of the spreaders and coacting parts.

2 is the body portion or housing of the valve and is provided with inlet and outlet ports 3, 3, the valve being adapted to operate for a flow of fluid in either direction desired. The valve discs for controlling the inlet and outlet ports 3 are indicated at 4 and 4a and may be made in any suitable manner to insure a tight closure during the normal operation of the valve. 5 is the screw-threaded operating stem of the valve for raising and lowering the valve discs 4 and 4a and is journaled at its upper end in a suitable stuffing box 7 on the bonnet 6 of the valve (Fig. 7). The general construction of the body, bonnet and stuffing box features of the valve is unimportant and may be of any of the usual constructions found desirable.

8 represents a stem nut and is internally screw-threaded for working relation with the screw threaded valve stem 5. This stem nut 8 has an adjustable connection with the valve discs 4 and 4a by longitudinal bearings 8a on the said discs 4 and 4a in which it is loosely journaled; and has further connection by means of the collar 9 which is received in recesses 10 in hub portions 11 upon the respective assembled valve discs 4 and 4a. The recesses 10 are of greater vertical or axial height than the thickness of the collar 9 so that the collar has a reasonable amount of longitudinal play between the shoulders 12 and 13 of the recess 10, this play being necessary to allow a sufficient shifting of the stem nut to release the clamping action of the wedge-shaped portions of the operative mechanism, as hereinafter explained. Not only is this necessary in respect to the stem nut, but the action of said stem nut through the discs 4 and 4a permits longitudinal adjustment of the bottom wedge nut 15 in its bearings 21, so that the lower parts of said valve discs 4 and 4a are released from pressure and may be made to make a sliding contact with the faces of the inlet and outlet ports of the valve body.

Referring again to the upper or stem nut shown more fully in Fig. 5, it will be seen that this nut is provided with laterally extending wedge-like lugs 16 and 17, said portions being on diametrically opposite sides of the axis of the nut and also having their inclined or wedge-like surfaces facing in opposite directions. When this stem nut is arranged in axial position with respect to the valve discs 4 and 4a, the inclined face 17 bears a relation to an oppositely inclined face 17a of the disc 4 which provides a V-shaped space between said parts 17 and 17a and which receives the V or wedge-shaped end 18 of one of the spreaders 14; the coaction with which, causes the said parts 17 and 17a to separate slightly, with the result that the discs 4 and 4a are tightly clamped to their respective seats.

The spreader 14 is adjustably held in position by means of guiding lugs 19 formed upon the inner face of the valve disc 4, said lugs permitting some shifting in the axial direction of the valve.

Similarly, at the other end of the spreader 14 is arranged the bottom wedge 18a which, as in the case of the wedge end 18 (coacting with inclined faces 17 and 17a), coacts with the inclined faces of the lugs 20 and 20a, the former being upon the bottom wedge nut 15 and the latter upon the gate or valve disc 4a. It will be further understood that the inclined lugs 20 and 20a form between them a wedge-shaped recess or space into which the wedge end 18a of the spreader 14 is received and cooperates, all as indicated in Figs. 1 and 2. As the bottom wedge nut 15 is provided with oppositely directed inclined lugs similar to 16 and 17 in connection with the stem nut 8, the wedge action between the spreader and the wedge-shaped recesses is duplicated on opposite sides of the axial line of the bottom wedge nut 15 and the stem nut 8, as is indicated in Fig. 1 as compared with Fig. 2, these figures illustrating the two separate spreaders.

Describing further, the action of the stem nut 8 in the process of closing the valve due to the inclined surfaces 16 and 17 on opposite sides of the axis of the stem nut, it will be noted that the pressure exerted causes the threaded stem nut to take a slight rotative motion in its bearings 8a and on the threaded valve stem 5, but at the same time keeping it axially in line with the valve stem, thus preventing any side strain on same. In this manner, injurious bending action upon the stem is avoided.

It will also be seen that the bottom wedge nut 15 is longitudinally guided in bearings 21 for slight rotary movement while being held substantially within reasonable limits as to such movement. This bottom wedge nut is provided with an extension or shoulder 15a which coacts with abutment portion 21a on the discs and which lift the bottom wedge nut at the time of opening the valve, so that the nut rises with the valve discs 4 and 4a. It will readily be understood now that when the upper stem nut 8 is moved downward, it also pushes the spreader 14 downward slightly and at the same time the end 18 of the spreader, operating between the parts 17 and 17a, spreads the discs 4 and 4a to fit tightly upon the valve seats. Also, the other wedge end 18a of the spreader 14, being thrust between the inclined face or wedge portion 20 of the lower wedge nut 15 and the inclined wedge or cam portion 20a on the disc 4, causes the said surface parts 20 and 20a to be slightly spread after the nut 15 contacts with the abutment 15b on the casing, and thereupon spreads the valve discs 4 and 4a at the bottom in a manner commensurate with the spreading of the upper parts of the discs under the action of the parts 17, 17a and 18, as before described, and maintaining the discs in parallel relation during their opening and closing functions.

Referring to the modification shown in Fig. 8, it will be seen that instead of the ends 18 and 18a of the spreaders 14 being made with V shaped ends each having oppositely arranged inclines and whereby one of these inclines cooperates with the wedge lugs 17 and 20 of the respective stem and bottom nuts 8 and 15, the spreader in the modification indicated at 14a is provided with one set of the inclined surfaces 18 and 18a which directly cooperate with the said wedge lugs 17 and 20 but have the other inclined surfaces of the parts 18 and 18a made substantially flat and in vertical alinement and arranged to press directly upon the back surface of one of the valve discs, so that in a general sense the modification is the equivalent of the structure shown in the other figures but depends upon the coaction of the wedge lugs 17 and 20 of the stem nut and bottom nut for providing the spreading action of the valve discs during the functioning of the valve in opening and closing operations. In this modification, the same spreading results between the two valve discs are secured as in the other figures, but the inclined surfaces would be greater or the longitudinal movement of the stem and bottom nuts would be greater than would be required in the case of the double wedge spreaders 14, as shown in Figs. 1 and 2 for example. I, therefore, do not limit my invention to the specific details of the spreaders 14 or 14a but include such modifications thereof as will insure the double spreading of the discs to secure the maintenance of the parallelism.

It will further be seen that the wedge ends 18 and 18a preferably have curved wedge surfaces where they contact with the flat inclined surfaces 17 and 20 of the stem and bottom wedge nuts 8 and 15, so as to give a ball joint action and minimum friction, as will readily be understood from Fig. 4.

Cotter pins 22 are shown as threaded through holes 23 in two pairs of hinge lugs 24 on the backs of the valve disc members 4 and 4a, said pins being desirable in assembling the operative parts before being placed in the housing or body case 2; and as these cotter pins very loosely fit the holes 23 in the lugs they may preferably remain in the assembly when the valve mechanism is placed in the housing or casing without interfering with the relative movements of the valve discs 4 and 4a. It will also be understood that when the parts are assembled in working relation, the cotter pins serve the function of hinging or holding the two valve disks in proper correlation when the gate valve is fully opened or when the working valve disks and spreaders are being inserted or removed with respect to the casing.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details stated as the same are susceptible of modification in various particulars, without departing from the spirit or scope of the invention.

Having now described my invention, what I claim and desire to secure by Letters Patent is:

1. In a valve of the character stated, a valve body having parallel seats with two valve discs arranged back to back and between the seats, a stem nut having freedom for a limited axial movement relatively to the discs and adapted to move them to and from their valve seats, and a bottom wedge nut also having limited axial movement upon the valve discs and cooperating with the stem nut for imparting relative parallel movements to the discs, said nuts provided with lateral wedge-shaped lugs, in combination with spreaders arranged upon opposite sides of the axial line of the nuts and having wedge shaped surfaces at their ends in operative relation with wedge lugs upon the stem and bottom nuts.

2. The invention according to claim 1, wherein further, the spreaders form a wedge connection between their end portions and the respective valve discs.

3. The invention according to claim 1, wherein further, spreaders are definitely positioned between the wedge lugs of the stem and bottom nuts and the valve discs but free to have longitudinal movement relatively to the wedge lugs of the stem and bottom nuts, so as to provide a relative spreading action to the valve discs when the stem nut is positively moved toward the bottom nut.

4. The invention according to claim 1, wherein further, means are provided upon the respective valve discs each supporting one of the spreaders against free lateral movement to and from each other while permitting longitudinal movement relatively to the wedge lugs of the stem and bottom nuts.

5. The invention according to claim 1, wherein further, the stem and bottom nuts are journaled in bearings upon adjacent portions of the discs, and wherein also a rotary threaded operating shaft is provided in connection with the stem nut and the strain of whose final rotation is relieved by being imparted to the said stem and bottom nuts.

6. The invention according to claim 1, wherein further, the valve discs are each provided with hinging lugs oppositely directed, and loosely fitting engaging pins are employed for coupling said hinging lugs whereby the operative valve parts may be bodily removed from or introduced into the housing or valve body.

7. The invention according to claim 1, wherein further, loose mechanical connection is provided between the parallel valve discs which, while holding the operative parts comprising the discs, the nuts and the spreaders in correlated positions for easy insertion and removal from the housing or valve body, permits of relative movement of the valve discs to or from each other as in opening or closing the valve.

In testimony of which invention, I hereunto set my hand.

HERBERT M. LOFTON.